May 26, 1931.                    W. OWEN                      1,806,862
                    PROCESS FOR SEVERING COMPOSITE GLASS
                    Filed July 7, 1928        3 Sheets-Sheet 1
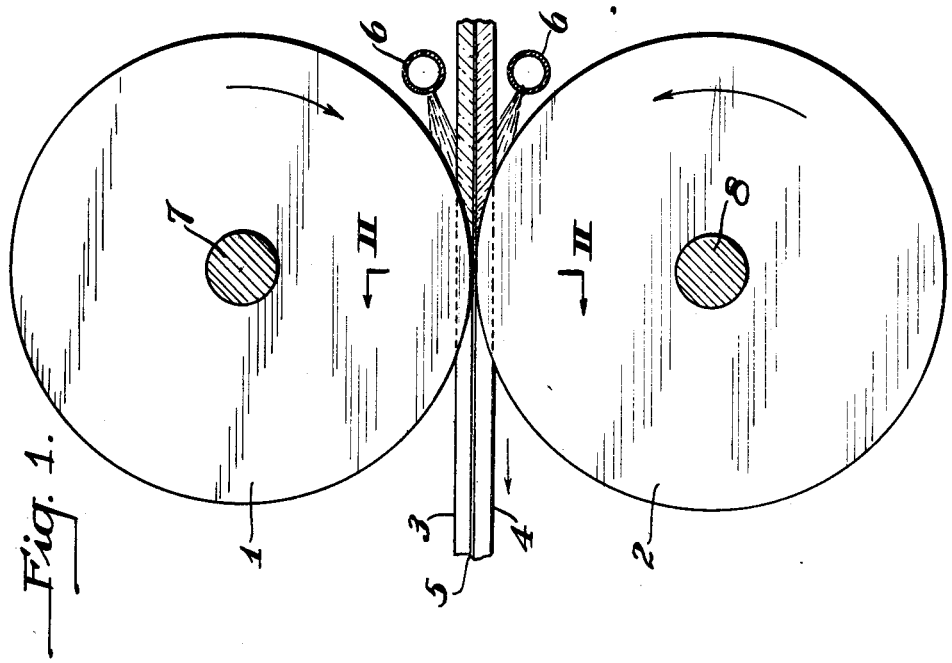
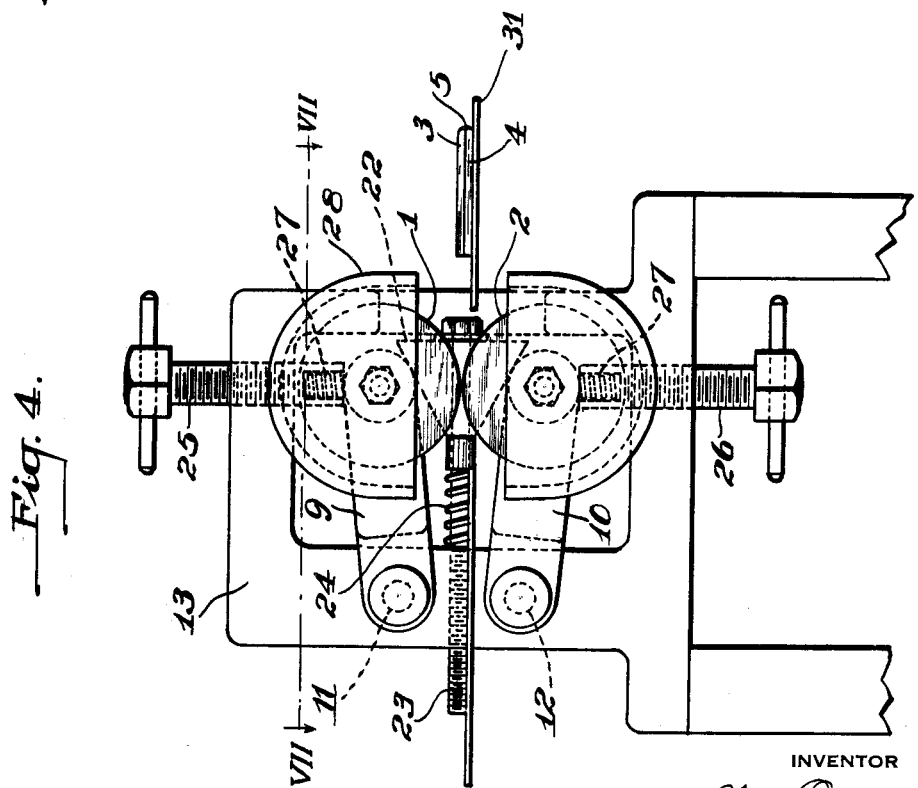
INVENTOR

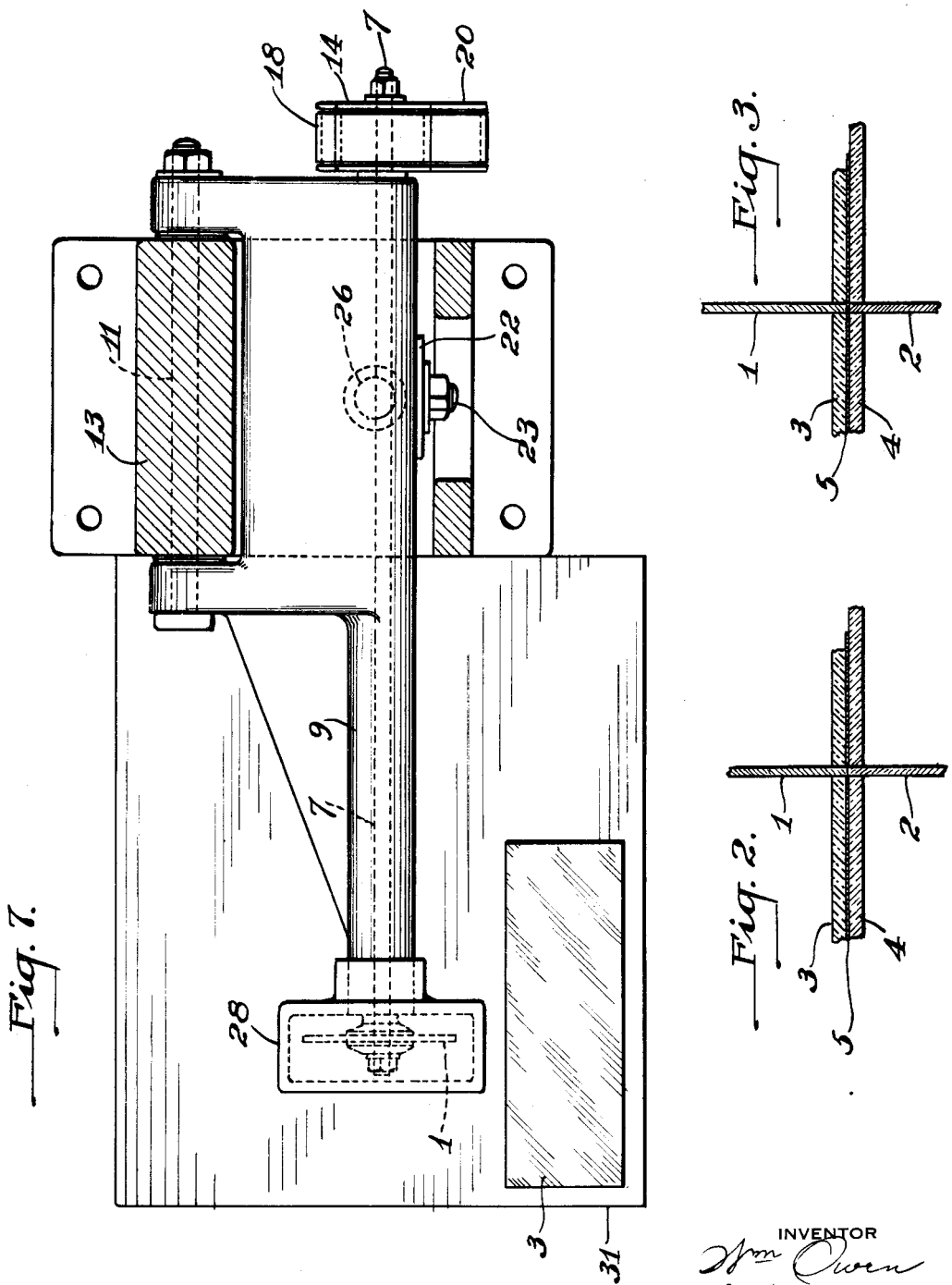

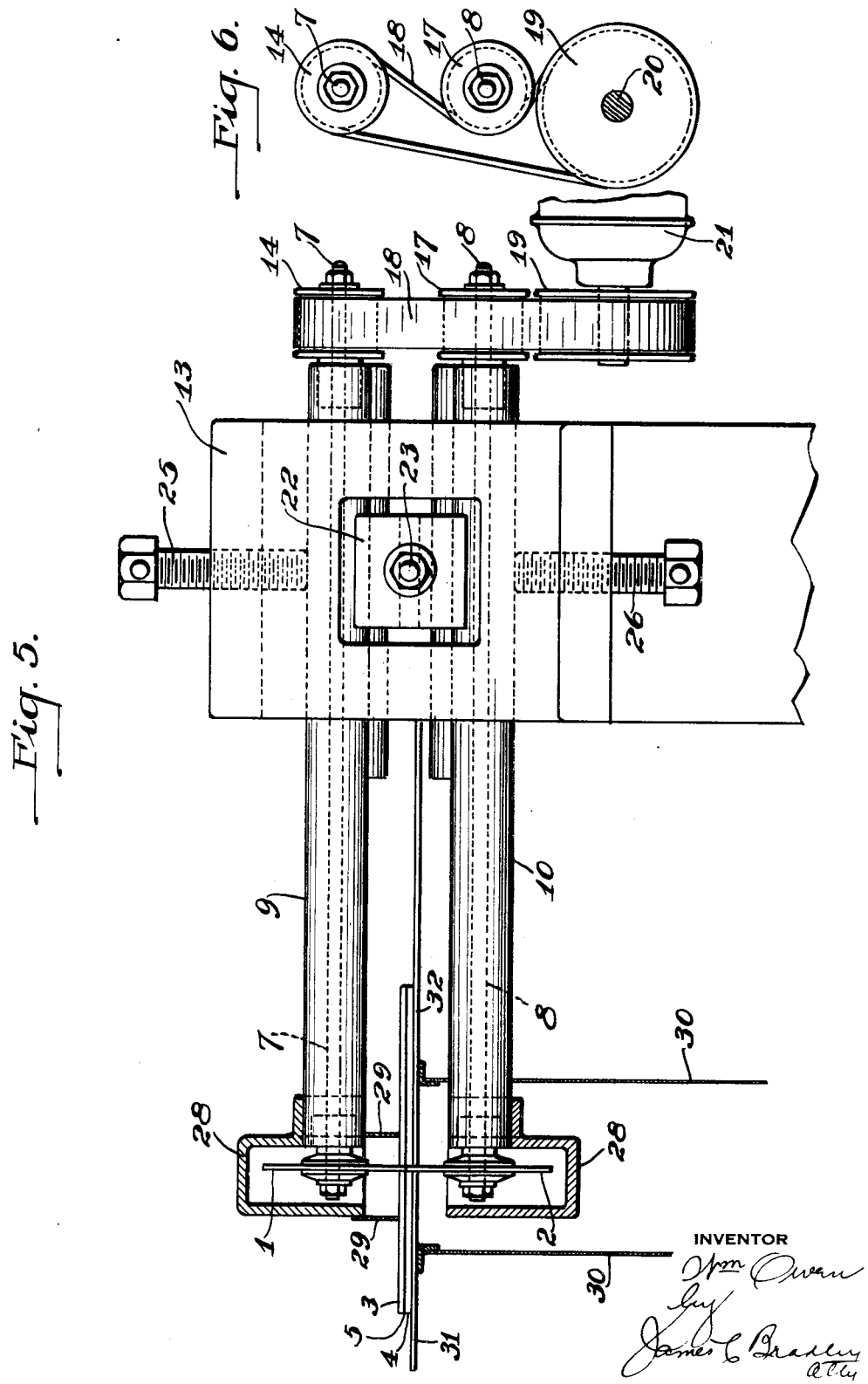

Patented May 26, 1931

1,806,862

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

PROCESS FOR SEVERING COMPOSITE GLASS

Application filed July 7, 1928. Serial No. 291,072.

The invention relates to a process for severing so-called composite glass plates, consisting in each case of a pair of glass sheets with an interposed sheet of tough, transparent material, ordinarily pyroxylin plastic, such as, celluloid, or the like, to which the glass is cemented or otherwise attached. The invention has for its objects the provision of a method whereby the glass can be severed quickly and at a low cost without any chipping or breaking of the glass; and the provision of a method which is applicable to the cutting of curves. Briefly stated, the process consists in slotting the two sheets of glass simultaneously, but without completely severing the interposed reinforcing sheet, a part, or all of which, is left intact. The leaving of the reinforcing sheet intact, in part or in whole, gives a support to the edges of the sheets being cut and reduces the tendency to crack and chip, and, after the completion of the slotting operation, the thin layer of reinforcing material left is easily separated. Preferably, the reinforcing sheet is cut partially through, in which case, the application of a small amount of force is sufficient to tear or rupture the remaining material. When the reinforcing material is left entirely intact, it can be easily separated by inserting a thin cutting blade through one of the slots cut through the glass, and cutting through the material entirely, or scoring it, so that it is easily ruptured. One embodiment of the apparatus preferably employed is shown in the accompanying drawings, wherein:

Figure 1 is a diagrammatic side elevation view showing the relation of the cutting wheels to the sheets of composite plate during the cutting operation. Fig. 2 is a section on the line II—II of Fig. 1. Fig. 3 is a section similar to that of Fig. 2, but with the cutting discs adjusted so as to just cut through the glass sheets, leaving the celluloid sheet intact. Fig. 4 is a side elevation of the machine. Fig. 5 is an end elevation with a part of the structure broken away. Fig. 6 is a partial side elevation showing the arrangement of the belt drive. And Fig. 7 is a section on the line VII—VII of Fig. 4.

Referring first to Figs. 1, 2 and 3, the wheels or discs 1 and 2 are shown in the operation of cutting a composite plate comprising the sheets of glass 3 and 4 and the interposed sheet 5 of celluloid. The discs 1 and 2 are preferably about one-sixteenth inch in thickness, and are composed of a phenol formaldehyde condensation product mixed with a suitable proportion of granular carborundum or other suitable abrasive. This is a well-known glass cutting element which will stand up under the heat conditions developed and which will give a period of service such that the disc replacement cost is relatively slight. The wheels are kept wet during the slotting operation by the use of the spray pipes 6, 6 through which water is supplied under pressure. As shown, the cutting discs are adjusted so that they cut entirely through the glass sheets 3 and 4 and into the celluloid sheet 5. The sheet 5 is ordinarly about one thirty-second of an inch in thickness so that the celluloid which remains is very thin, possibly about one sixty-fourth of an inch or less. After the cutting operation, this thin layer of celluloid is easily torn or ruptured when a twisting or shearing strain is applied to the two parts of the partially severed plate. If desired, the discs may be set so as to just cut through the glass sheets and no more, in which case a scoring tool is later used to sever or partially sever the celluloid sheet. However, less difficulty is encountered if the discs are adjusted far enough in to cut into the celluloid as indicated in Figs. 1 and 2. Since the cutting discs are placed exactly opposite each other, and the discs are relatively thin, it is not difficult to use the device in cutting curves, such as are required on the lower sides of most windshield plates. The amount of glass which must be cut away is less, and the danger of breakage is less with apparatus of this type having discs directly opposite each other than is the case where the discs are in tandem, as heretofore proposed. In cutting the slots, there must be a relative movement of the cutting discs bodily with respect to the glass sheets, and this is preferably accomplished by having the axes of rotation of the abrading discs fixed and moving the glass (supported on a table or bed) past the discs; but the invention also comprehends the reverse arrangement wherein the glass may be held on an immovable bed, and the axes of rotation of the discs given a movement of translation relative to the glass.

The cutting discs 1 and 2 are clamped to the ends of a pair of shafts 7 and 8, journaled in the arms 9 and 10, and the arms 9 and 10 are pivoted at 11 and 12 in the frame 13 of the machine. The right hand ends of the shafts 7 and 8 (Fig. 5) are provided with the belt pulleys 14 and 17 around which passes the belt 18, such belt also passing around the driving pulley 19 carried by the shaft 20 of the motor 21.

A wedge 22 spaces the arms 9 and 10 apart and so regulates the positions of the cutter discs 1 and 2. The position of the wedge is adjusted by means of the rod 23, which is threaded through the frame 13. A spring 24 surrounds the rod 23 and serves to move the wedge to the right (Fig. 4) when the rod 23 is unscrewed. This occurs when it is desired to adjust the discs 1 and 2 toward each other, the rod being screwed to the left to separate the discs. The arms 9 and 10 are clamped against the sides of the wedge by means of the rods 25 and 26 threaded through the upper and lower arms, respectively, of the frame 13. The ends of these rods are recessed (Fig. 4) and provided with the springs 27, 27 for holding the arms 9 and 10 against the wedge when the clamping rods are loosened in order to adjust the wedge 22. This is a matter of convenience in making the adjustment, as with the springs 27, 27 thus pressing the arms against the wedge, the operator is informed as to the relative positions of the edges of the cutting discs as he adjusts the wedge and before tightening the clamping rods 25 and 26. The cutting discs are preferably provided with the housings 28, 28 and the rubber sheets 29, 29 and 30, 30 are provided as splash guards (Fig. 5).

In operation, the shafts 7 and 8 carrying the cutting discs are rotated at a relatively high rate of speed, and the glass plate, supported upon a suitable bed or table comprising the plates 31 and 32, is moved by the operator between the cutting discs in such manner as to groove the composite plate upon its two sides along the desired line of cut, the plane of the surface of the bed or table being such that the grooves cut are of substantially the same depth extending completely through the glass sheets, but leaving a portion at least of the celluloid sheet unsevered. The movement of the plate to be cut may be either in a straight away direction, or in a curve, depending upon the line of cut desired, the machine being adapted to take care of both classes of work. As the cutting discs become worn and decrease in diameter, the necessary adjustment is made by means of the wedge to keep the peripheries of the discs at the same distance apart.

What I claim is:

1. A process of severing a composite glass plate comprising a pair of glass sheets with an interposed sheet of tough, transparent material, which consists in simultaneously cutting slots completely through the glass sheets in opposition to each other, leaving a part at least of the interposed sheet unsevered, and then separating the interposed material lying between the slots.

2. A process of severing a composite glass plate comprising a pair of glass sheets with an interposed sheet of tough, transparent material, which consists in simultaneously cutting slots completely through the glass sheets in opposition to each other, and through a portion only of said interposed sheet and then separating the portion remaining of the interposed material lying between the slots.

3. A process of severing a composite glass plate comprising a pair of glass sheets with an interposed sheet of tough, transparent material, which consists in simultaneously cutting slots completely through the glass sheets in opposition to each other, and through a portion only of said interposed sheet, and then applying force to the two parts of the plate to rupture the thin portion of interposed material lying between the slots.

In testimony whereof, I have hereunto subscribed my name this 2nd day of July, 1928.

WILLIAM OWEN.